United States Patent
Cribiu'

(10) Patent No.: US 6,827,204 B2
(45) Date of Patent: Dec. 7, 2004

(54) BELT FOR CONVEYOR

(75) Inventor: Oreste Cribiu', Gerenzano (IT)

(73) Assignee: Costruzioni Meccaniche Crizaf SpA, Saronno (IT)

( * ) Notice: Subject to any disclaimer, the term of this patent is extended or adjusted under 35 U.S.C. 154(b) by 0 days.

(21) Appl. No.: 10/822,675

(22) Filed: Apr. 13, 2004

(65) Prior Publication Data

US 2004/0222073 A1 Nov. 11, 2004

(30) Foreign Application Priority Data

May 6, 2003 (EP) .............................................. 03425290

(51) Int. Cl.⁷ .............................................. B65G 15/30
(52) U.S. Cl. ..................... 198/844.1; 198/850; 198/822
(58) Field of Search ........................ 198/844.1, 844.2, 198/850–853, 822

(56) References Cited

U.S. PATENT DOCUMENTS

| | | | | |
|---|---|---|---|---|
| 1,686,533 A | * | 10/1928 | Ronning et al. | 198/822 |
| 2,681,728 A | * | 6/1954 | Boron | 198/851 |
| 2,725,975 A | * | 12/1955 | Franz | 198/822 |
| 3,980,425 A | * | 9/1976 | Pinettes et al. | 432/239 |
| 4,688,670 A | * | 8/1987 | Lapeyre | 198/853 |
| 4,729,469 A | * | 3/1988 | Lapeyre et al. | 198/834 |
| 4,832,183 A | | 5/1989 | Lapeyre | |
| 5,137,144 A | * | 8/1992 | Uehara | 198/822 |
| 5,247,789 A | * | 9/1993 | Abbestam et al. | 59/78 |
| 5,507,383 A | | 4/1996 | Lapyere et al. | |
| 5,634,550 A | * | 6/1997 | Ensch et al. | 198/457.05 |
| 6,467,610 B1 | * | 10/2002 | MacLachlan | 198/699.1 |
| 6,571,935 B1 | * | 6/2003 | Campbell et al. | 198/690.2 |
| 6,695,135 B1 | * | 2/2004 | Lapeyre | 198/853 |
| 6,708,818 B2 | * | 3/2004 | Kato et al. | 198/853 |

FOREIGN PATENT DOCUMENTS

EP          1 074 490 A1    5/2001

* cited by examiner

*Primary Examiner*—Richard Ridley
(74) *Attorney, Agent, or Firm*—Nixon & Vanderhye, P.C.; Frank P. Presta

(57) ABSTRACT

A belt (100) is described for a conveyor, in particular for conveying molded items of plastic material leaving a molding unit. Said belt comprises a plurality of transverse plates or tracks (1) disposed side by side and constrained hingedly to each other to form an endless belt, wherein some (10) of said transverse plates have transverse tongues (50) which protrude substantially at right angles to the plane of the transverse plates (10), the transverse tongues (50) being made from soft, rubber-based material to avoid deformation of the molded items which fall thereon.

9 Claims, 4 Drawing Sheets

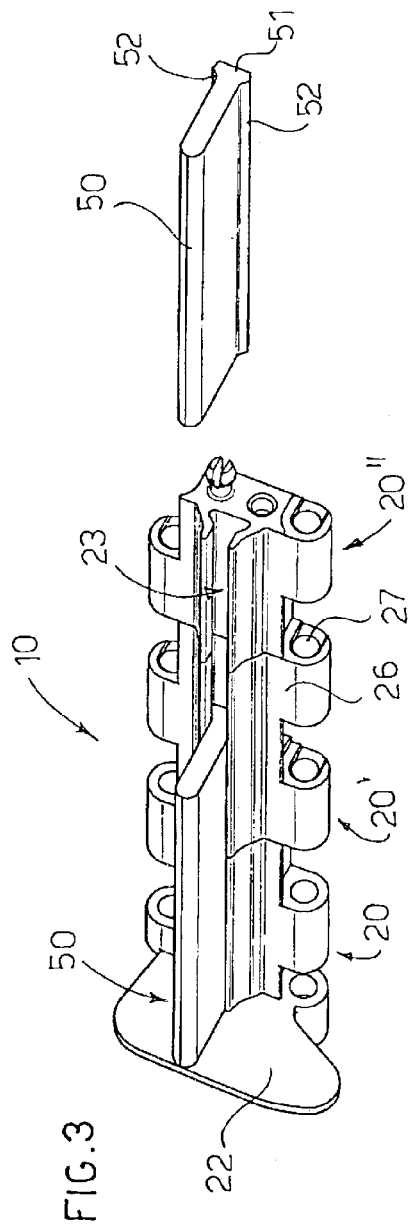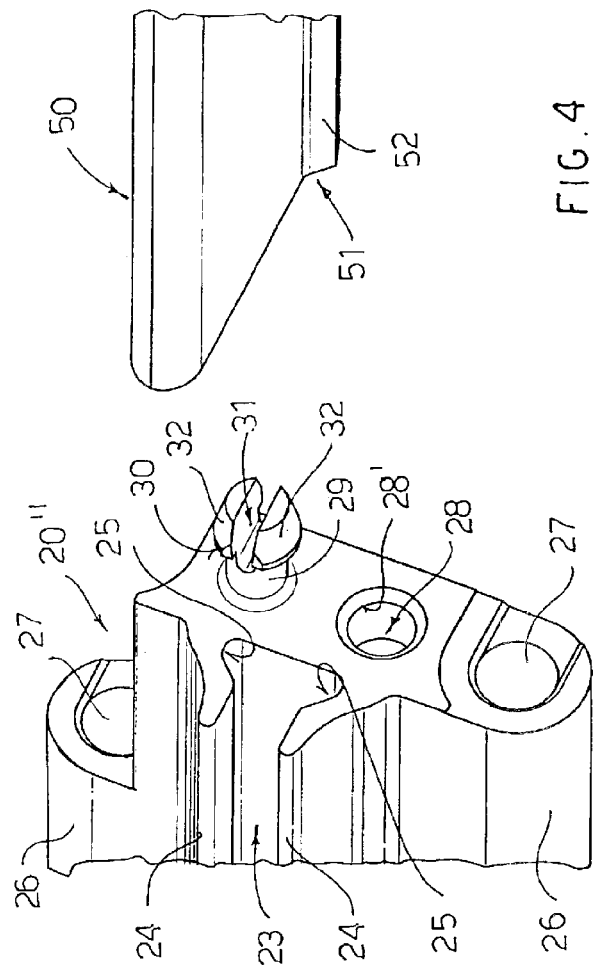

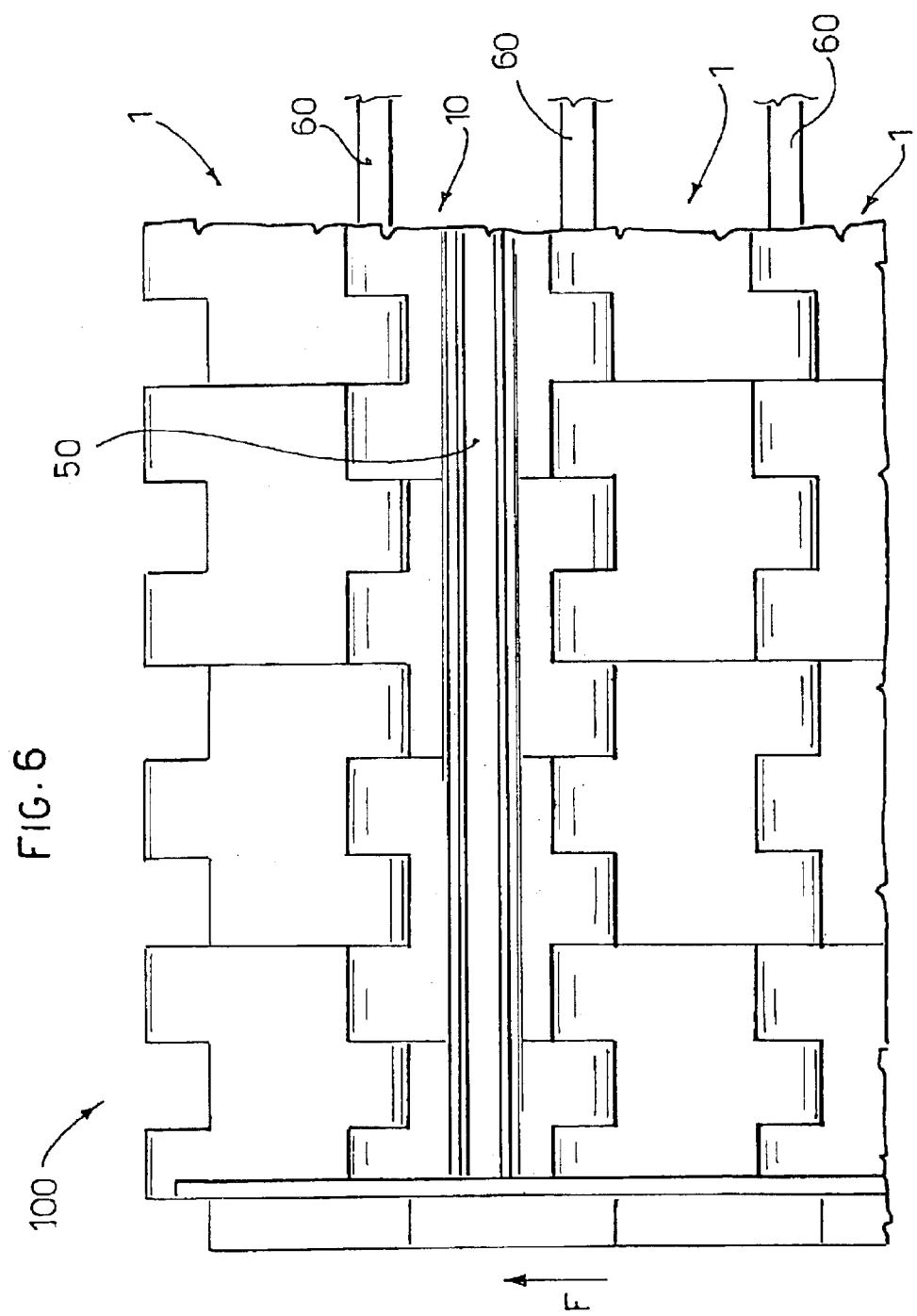

BELT FOR CONVEYOR

The present invention refers to a belt for a caterpillar type conveyor, in particular for conveying moulded plastic parts leaving a moulding unit.

As is known, conveyors are used to convey various types of articles, items and parts. The conveyor has an endless belt or band, supported by guides and rollers arranged on a supporting frame. At least one of said rollers is motorised so as to allow the movement of the conveyor belt.

The conveyor belt has in its outward facing surface a plurality of tongues disposed transversally with respect to the direction of travel and protruding outward at right angles to the plane of the conveyor belt. Said transverse tongues serve to generate an abutment surface, so as to prevent the parts from slipping on the conveyor belt, especially if the belt is disposed on an inclined plane.

Various types of conveyor belt are commercially available. One type of conveyor belt has a plurality of tracks shaped as transverse plates disposed side by side and hinged to each other by means of pivot rods, so as to form a substantially flat surface. Said plates are alternated with plates provided with a respective tongue which protrudes outwards at right angles with respect to the plane of the belt.

The plates of the belt are made by injection moulding of plastic material. As a result each plate provided with a tongue is made of hard plastic in a single piece.

Conveyor belts are also known wherein the tongues are made separately from the plates and then fixed to the plates by means of screw means. Clearly in this case also the tongues are made of hard plastic because they must have threaded holes for engagement of the screw means.

In order to adjust the width of the conveyor belt, instead of a single transverse plate a plurality of plate elements brought together alongside each other so as to obtain the desired length can be provided. In this case also the plate elements with tongues are made in a single piece by moulding of plastic material.

The plate members are kept in position thanks to the fact that they are hinged to the respective hinge rods. However, said system does not offer a safe hold of the elements, which are not constrained to each other, but simply placed side by side.

This type of conveyor belt presents drawbacks when it is used to convey moulded plastic items. In fact, when the moulded item leaves the mould it is still warm and the plastic is in a semi-solid state, so it can be easily deformed. If the moulded item falls directly onto the rigid transverse tongues of the conveyor belt, it undergoes a certain deformation because of its weight and the force of gravity due to its fall.

This deformation of the moulded item is unacceptable, especially in the case of items destined to have an aesthetic or design function, such as, for example, parts of vehicles and the like which are on view. As a result, when the deformed item reaches quality control it is rejected, with a consequent economic and production loss.

This drawback is overcome, at least in part, by the conveyor belts of the prior art which have a core of synthetic woven material which is coated with a layer of rubber, wherein transverse tongues to convey the items and undulated side edges to prevent the deadhead from leaving the moulded items are formed.

In this case, when the moulded item falls onto a transverse tongue of soft rubber of the belt, it causes bending thereof and thus the item does not undergo deformation. However, such a type of conveyor belt is extremely expensive. Furthermore, damage to a single tongue or portion of the rubber coating requires replacement of the entire belt, with the result of a considerable economic loss.

U.S. Pat. No. 4,832,138 discloses a conveyor belt according to the preamble of claim 1.

The object of the present invention is to overcome the drawbacks of the prior art, providing a conveyor belt that is suitable for work with moulded plastic articles leaving a mould in the semi-solid state.

Another object of the present invention is to provide such a conveyor belt that is cheap and easy to make.

Yet another object of the present invention is to provide a conveyor belt that is extremely reliable and involves low maintenance and repair costs.

These objects are achieved in accordance with the invention with the characteristics listed in appended independent claim 1.

Advantageous embodiments of the invention are apparent from the dependent claims.

The conveyor belt according to the invention comprises a plurality of transverse plates or tracks disposed side by side and constrained to each other hingedly to form an endless belt, wherein some of said transverse plates have transverse tongues made of soft, rubber-based material which protrude substantially at right angles with respect to the plane of said transverse plates.

The conveyor provided with the belt according to the invention is particularly suitable to be disposed at the output of a moulding or blow-moulding unit. In this manner the moulded items, still warm and in a semi-solid state, on falling onto the transverse tongues cause bending thereof and, therefore, do not suffer any damage.

Further characteristics of the invention will be made clearer by the detailed description that follows, referring to a purely exemplary and therefore non-limiting embodiment thereof, illustrated in the appended drawings, wherein:

FIG. 3 is a perspective view of the three elements of FIG. 1 assembled, wherein a portion of transverse tongue has been inserted, and another portion of transverse tongue is illustrated exploded;

FIG. 4 is an enlarged view of a detail of FIG. 3;

FIG. 6 is a top plan view diagrammatically and partially illustrating a conveyor belt according to the invention.

Figure 1:
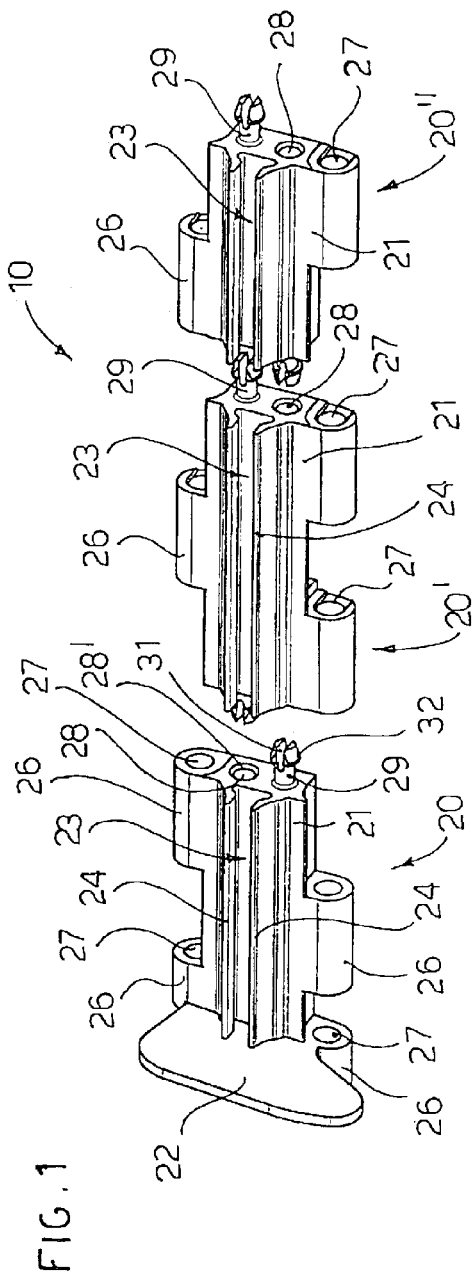
FIG. 1 is a perspective exploded view illustrating three elements forming part of a plate or track of the conveyor belt according to the invention, wherein the three elements are seen from above.

The conveyor belt according to the invention is described with the aid of the figures.

FIG. 6 illustrates partially and schematically a conveyor belt according to the invention, denoted as a whole with reference numeral 100. The conveyor belt 100 has a plurality of tracks or plates 1 destined to be disposed transversally with respect to the path of travel of the belt indicated by the arrow F. The transverse plates 1 are disposed side-by-side and constrained hingedly to one another, by means of rods 60, so as to form tracks for the conveyor belt 100.

Alternating between the transverse plates 1 are some transverse plates 10 which have tongues 50 that protrude at right angles therefrom.

Figure 2:
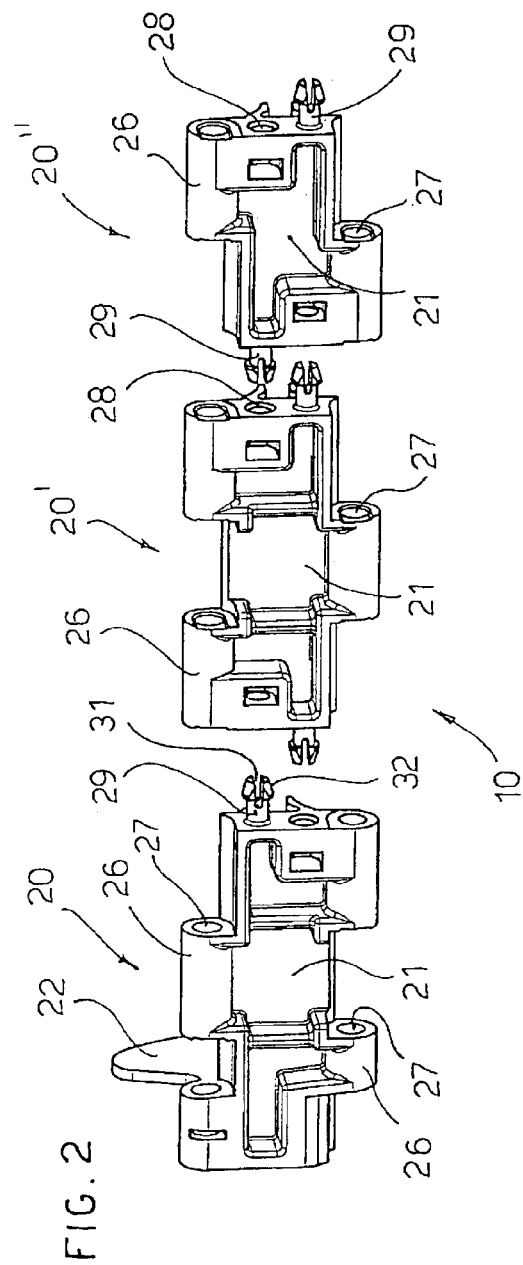
FIG. 2 is a perspective exploded view of the three elements of FIG. 1, seen from below.

As shown in FIGS. 1 and 2, a transverse plate 10 can be made, in a modular fashion, by means of a plurality of aligned elements 20, 20', 20" of different shapes and lengths, so as to obtain the plate 10 of the desired length.

By way of example, there are illustrated in FIGS. 1 and 2, starting from the left, a terminating element 20, an intermediate element of longer length 20' and an intermediate element of shorter length 20". According to the desired length, the plate 10 may have other intermediate elements 20' and 20" and will be completed by a terminating element complementary to the terminating element 20.

The terminating element 20 comprises a central body 21 shaped substantially as a rectangular plate, which has at its end a side wall 22. A guide channel 23 which extends longitudinally from the side wall 22 to the other end of the element 20 is formed on the top surface of the central body 21, in a central position.

The channel 23 is defined by two longitudinal ribs 24 parallel to each other. Each rib 24 has a first oblique portion and a second portion at right angles to the plane of the body 21. In this manner the guide channel 23 is shaped substantially as an upturned T when seen in cross section. The oblique portions of the ribs 24 converge with one another, so as to form two undercut abutment surfaces 25 (FIG. 4) in the guide channel 23.

Substantially tubular elements 26 which protrude outward and have through holes 27 having their longitudinal axis parallel to the guide channel 23 are provided on the larger sides of the central body. The tubular elements 26 are suitably spaced apart and offset from one another on both larger sides of the central body 21.

To be precise, the terminating element 20 has four tubular elements 26, disposed in pairs on the two larger sides of the central body 21. Each tubular element 26 disposed on one side of the central body 21 is in register with a corresponding gap formed between two tubular elements disposed in the opposite side of the central body. The length of each tubular element 26 is equal or slightly smaller than the corresponding gap formed between two tubular elements.

At the end of the central body 21, opposite the terminal side wall 22, there is provided a hole 28 with its longitudinal axis parallel to the axis of the guide channel 23. The hole 28 has on its inside an annular abutment edge 28'.

Again in said end of the central body 21, to the side with respect to the hole 28, a pin 29 which protrudes longitudinally outward is provided. The pin 29 has a tapered head with a larger diameter so as to define an annular abutment surface 30. The head of the pin 29 is cut by an incision 31, so as to define two tapered tongues 32 which can bend elastically in the incision 31.

As far as concerns the intermediate elements 20' and 20" of the transverse plate 10, like reference numerals have been used to indicate parts like or corresponding to those already described with reference to the terminating element 20 and a detailed description thereof has been omitted.

In particular the intermediate element of greater length 20' has three tubular elements 26 of the same length, that is to say one tubular element 26 disposed in a central position on one side of the central body 21 and two tubular elements 26 disposed in offset positions on the opposite side of the central body 21.

On the other hand, the intermediate element with a shorter length 20" has two tubular elements 26 of the same length, disposed in offset positions on the two opposite sides of the central body 21.

Guide channels 23 which extend longitudinally from one end to the other of the central body 21 are provided in both intermediate elements 20' and 20".

Furthermore, both intermediate elements 20' and 20" have at their two opposite ends of the central body 21 a pin 20 and a hole 28, respectively.

Assembly of the transverse plate 10 is described with reference in particular to FIGS. 2 and 3.

First of all the various elements 20, 20' e 20" of the transverse plate 10 are disposed aligned in a row. Then, they are brought close to each other so that the pin 29 of one element engages in the hole 28 of the adjacent element.

Each pin 29 engages in the respective hole 28 in a snap coupling relationship. In fact the two tapered tongues 32 of the head of the pin 28, in contact with the walls of the hole 28, bend elastically in the cut 31 until the larger diameter abutment surface 30 of the head of the pin passes the annular edge 28' of the hole 28. Then, in this situation the tongues 32 snap back elastically and the annular abutment surface 30 abuts against the annular edge 28' of the hole, retaining the pin 29 in the hole 28.

Once the various elements 20, 20', 20" are constrained to each other, guide channels 23 thereof are perfectly aligned with each other, forming a single guide channel. The transverse tongue 50 can thus be inserted in said guide channel 23, from right to left with reference to FIG. 3, until it abuts against the side wall 22 of the terminating element 20.

The transverse tongue 50 is made in a single piece, of soft material, and is substantially shaped as an upturned T in cross section. Said tongue 50 has a substantially swallowtail-shaped base 51 with two oblique portions 52 substantially complementary to the undercut parts 25 of the guide channel defined by the oblique parts of the ribs 24. In this manner the base 51 of the transverse tongue 50 can be inserted into the guide channel 23 and is kept substantially at right angles to the plane of the central body 21 of the elements of the transverse plate.

The transverse tongue 50 is retained in the guide channel 23 and cannot be extracted in any direction other than longitudinally to the guide channel 23. In fact the oblique portions 52 of the base 51 of the transverse tongue abut against the undercut portions 25 of the ribs of the guide channel.

Even if in the present embodiment a guide channel 23 having a substantially upturned T or swallowtail shape in cross section with two undercut portions 25 has been described, the guide channel 23 can clearly be of another shape, such as for example an L-shape, in cross section, with only one undercut portion and accordingly the base 51 of the tongue 50 will be of a shape complementary to that of the channel 23.

Clearly, one or more transverse tongues 50, even of different lengths, can be inserted in the guide channel of the transverse plate 10.

Figure 5:
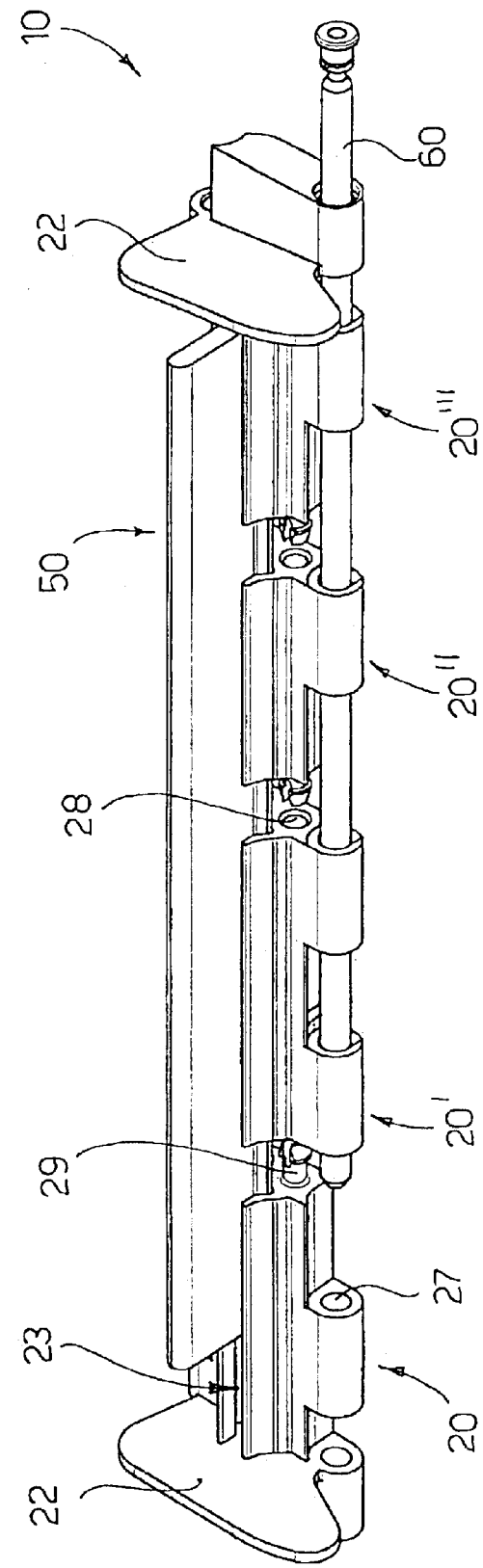
FIG. 5 is an exploded perspective view illustrating a transverse bar provided with a transverse tongue of the conveyor belt according to the invention.

As shown in FIG. 5, once the transverse tongue 50 has been inserted, another terminating element 20'", substantially similar to the terminating element 20, is mounted at the end of the transverse bar 10 opposite the terminating element 20, so as to block the transverse tongue 50 and prevent it from slipping out of the guide channel 23.

As far as concerns the transverse plates 1 without transverse tongues 50, they too can be made in a modular manner from different elements, such as elements 20, 20' e 20" without the guide channel 23 defined by the two ribs 24.

When formation of the transverse plates 10 provided with tongues 50 and of the transverse plates 1 without tongues 50 has been completed, a plurality of transverse plates 1 alternating with transverse plates 10 provided with tongues are brought together side by side on a plane.

In bringing together side by side the transverse plates 1 and 10, the tubular parts 26 of one plate fit into the gaps formed between the tubular parts 26 of the adjacent plate. As a result the holes 27 in the tubular parts 26 of two adjacent plates are coaxial. A pivot rod 60 is then inserted in said coaxial holes 26, so as to constrain hingedly two adjacent transverse plates.

Said operation is repeated for a plurality of transverse plates in such a manner as to obtain a belt 100 for a conveyor belt of the desired length. The last plate is then hinged to the first plate so as to obtain a closed endless belt.

Such a belt has two substantial advantages with respect to conventional caterpillar belts. The first advantage is that of avoiding damage to the parts to be conveyed thanks to the provision of transverse tongues 50 of soft material which bend when the parts fall thereon.

The second advantage is that of presenting a better stability and compactness thanks to the provision of the pins 29 of the various elements 20, 20', 20" which engage in respective holes 28 of the adjacent elements, thus avoiding misalignment of the various elements.

Furthermore such a belt 100 according to the invention presents the substantial advantage that possible damage to a transverse tongue 50 or to a single element 20, 20', 20" does not require replacement of the entire belt but replacement only of the damaged tongue or of the damaged element.

The modular elements 20, 20', 20" for formation of the transverse plates 10 and the modular elements for formation of the transverse plates 1 can be made in a single piece of hard plastic, by injection moulding. Among the various plastic materials, PP (polypropylene), PE (polyethylene), POM (polyoxymethylene, an acetalic resin) and PA66 (polyamide, nylon), for example, can be used for moulding.

The tongue 50 is made of soft rubber-based material. Said tongue can be made by extrusion and a mixture based on PVC (polyvinyl chloride) and rubber can be used.

In the present embodiment the solution wherein the soft rubber tongues 50 are made separately from the hard plastic elements 20, 20' and 20" which form the transverse plate 10 and subsequently the tongues 50 are assembled in the guide channel of said elements has been illustrated.

However, a solution can be provided wherein, by means of coinjection moulding, the tongue 50 can be made in a single piece with its supporting element 20, 20' o 20". In this case a suitable mould and a specific coinjection nozzle able to coinject into the mould cavity both plastic material for formation of the support 20, 20', 20" and thermoplastic rubber for formation of the tongue 50 in a single piece with the relative support must be provided.

Numerous variations and modifications of detail within the reach of a person skilled in the art can be made to the present embodiments of the invention and in any case come within the scope of the invention as set forth in the appended claims.

What is claimed is:

1. A belt for a conveyor, in particular for conveying moulded plastic pieces leaving a moulding unit, comprising:
    a plurality of transverse plates or tracks disposed side by side and constrained hingedly to each other to form an endless belt,
    wherein some of said transverse plates have transverse tongues which protrude substantially at right angles with respect to the plane of said transverse plates,
    said transverse tongues being made from soft rubber-based material, and
    wherein said transverse plates provided with transverse tongues and/or said transverse plates without transverse tongues, comprise a plurality of plate elements, of various shapes and lengths, disposed aligned with each other, so as to obtain a transverse plate of the desired length,
    said plate elements being constrained to each other in a snap coupling relationship.

2. A belt of claim 1, wherein in at least one of the two ends of said plate elements, there is provided a hole-pin pair able to engage in a snap coupling relationship with a respective hole-pin pair provided at the end of an adjacent element.

3. A belt of claim 2, wherein the head of said pin has a cut so as to form two elastic tongues provided with an abutment surface with a greater diameter able to abut against an annular abutment surface formed in the hole to retain the pin of one element inside the hole of an adjacent element.

4. A belt of claim 1, wherein said cross plates provided with cross tongues are made from hard plastic.

5. A belt of claim 1, wherein said transverse tongues are made separately from said transverse plates and are coupled to said transverse plates by means of coupling means.

6. A belt of claim 5, wherein said coupling means comprise a guide channel formed on the outer surface of said transverse plates able to receive, in a coupling relationship, the base of said transverse tongue.

7. A belt of claim 6, wherein said guide channel has at least one undercut portion able to abut against a respective protruding portion of the base of said tongue.

8. A belt of claim 7, wherein the cross section of said guide channel is substantially upturned T or swallowtail shaped and in that the base of said transverse tongue has a shape complementary to that of the guide channel.

9. A belt of claim 4, wherein said transverse tongues are made in a single piece with said transverse plates, by coinjection moulding, wherein a plastic material for formation of the transverse plate and a rubber-based thermoplastic material for formation of the transverse tongue are coinjected into the mould.

* * * * *